(12) United States Patent
Redding et al.

(10) Patent No.: US 10,981,242 B2
(45) Date of Patent: Apr. 20, 2021

(54) COLLAR ASSEMBLY FOR SECURING CONSUMABLES OF AN ARC WELDING APPARATUS

(71) Applicant: Victor Equipment Company, Denton, TX (US)

(72) Inventors: Glenn K. Redding, Flower Mound, TX (US); Khalid Hassan, Denton, TX (US)

(73) Assignee: Victor Equipment Company, Denton, TX (US)

( * ) Notice: Subject to any disclaimer, the term of this patent is extended or adjusted under 35 U.S.C. 154(b) by 273 days.

(21) Appl. No.: 16/043,573

(22) Filed: Jul. 24, 2018

(65) Prior Publication Data

US 2019/0039166 A1   Feb. 7, 2019

Related U.S. Application Data

(62) Division of application No. 14/541,136, filed on Nov. 13, 2014, now Pat. No. 10,052,708.

(60) Provisional application No. 61/903,950, filed on Nov. 13, 2013, provisional application No. 62/053,784, filed on Sep. 22, 2014.

(51) Int. Cl.
| | |
|---|---|
| *B23K 9/29* | (2006.01) |
| *B23K 9/28* | (2006.01) |
| *B23K 9/32* | (2006.01) |
| *B21D 19/00* | (2006.01) |
| *B23K 9/173* | (2006.01) |

(52) U.S. Cl.
CPC .............. *B23K 9/295* (2013.01); *B21D 19/00* (2013.01); *B23K 9/173* (2013.01); *B23K 9/285* (2013.01); *B23K 9/32* (2013.01)

(58) Field of Classification Search
CPC ........ B21D 19/00; B23K 9/173; B23K 9/285; B23K 9/295; B23K 9/32
See application file for complete search history.

(56) References Cited

U.S. PATENT DOCUMENTS

| | | | |
|---|---|---|---|
| 1,828,459 A | 10/1931 | Cornell et al. | |
| 1,835,179 A | 12/1931 | Rue et al. | |
| 2,427,894 A | 9/1947 | Benner | |
| 2,432,639 A | 12/1947 | Webster et al. | |
| 2,438,292 A | 3/1948 | Linker et al. | |

(Continued)

FOREIGN PATENT DOCUMENTS

| | | |
|---|---|---|
| CN | 201902729 U | 7/2011 |
| DE | 231519 A1 | 1/1986 |

(Continued)

OTHER PUBLICATIONS

Japanese to English translation of Ishii (JP 60-071482), Published in 1985.*

(Continued)

*Primary Examiner* — Justin C Dodson
(74) *Attorney, Agent, or Firm* — Edell, Shapiro & Finnan, LLC (57) ABSTRACT

An arc welding apparatus includes a conductor tube assembly that has a collar assembly with a collar body that is biased by a spring. A consumable assembly is mechanically secured to the conductor tube and displaces the collar body and the collar body imparts a biasing force against the consumable assembly pretensioning the consumable assembly on the conductor tube assembly.

5 Claims, 12 Drawing Sheets

(56) References Cited

U.S. PATENT DOCUMENTS

| | | | |
|---|---|---|---|
| 2,544,801 | A | 3/1951 | Muller |
| 2,944,525 | A | 7/1960 | Fagge |
| 3,018,360 | A | 1/1962 | Engel et al. |
| 3,629,547 | A | 12/1971 | Kester et al. |
| 3,783,233 | A | 1/1974 | dal Molin |
| 4,105,891 | A | 8/1978 | Hill et al. |
| 4,158,763 | A | 6/1979 | Moerke |
| 4,158,765 | A | 6/1979 | Moerke |
| 4,467,175 | A | 8/1984 | Reeh et al. |
| 4,554,432 | A | 11/1985 | Raloff |
| 4,994,707 | A | 2/1991 | Stark |
| 5,491,321 | A | 2/1996 | Stuart |
| 5,669,556 | A | 9/1997 | Yoshida |
| 5,974,917 | A | 11/1999 | Way |
| 5,998,760 | A | 12/1999 | Kunz |
| 7,576,300 | B2 | 8/2009 | Giese |
| 7,905,741 | B1 | 3/2011 | Wade et al. |
| 2004/0026394 | A1 | 2/2004 | Giese |
| 2005/0109738 | A1 | 5/2005 | Hewett et al. |
| 2007/0062922 | A1 | 3/2007 | Zamuner |
| 2007/0108173 | A1 | 5/2007 | Zamuner |
| 2007/0210049 | A1 | 9/2007 | Dingeldein |
| 2008/0035623 | A1 | 2/2008 | Hutchison |
| 2008/0035626 | A1 | 2/2008 | Christopher et al. |
| 2008/0188093 | A1 | 8/2008 | Jaeger |
| 2008/0290074 | A1 | 11/2008 | Speker et al. |
| 2009/0050609 | A1 | 2/2009 | Berger et al. |
| 2010/0123311 | A1 | 5/2010 | Church |
| 2011/0000893 | A1 | 1/2011 | Blankenship et al. |
| 2011/0006522 | A1 | 1/2011 | Bichler et al. |
| 2013/0134143 | A1 | 5/2013 | Hassan et al. |
| 2014/0263253 | A1 | 9/2014 | Meess et al. |

FOREIGN PATENT DOCUMENTS

| | | |
|---|---|---|
| JP | S60-71482 U | 5/1985 |
| JP | S60-170574 A | 9/1985 |
| JP | H07256462 A | 10/1995 |
| JP | 2004276084 A | 10/2004 |
| JP | 2004-322127 A | 11/2004 |
| JP | 2009-142850 A | 7/2009 |
| KR | 2012-0000369 U | 1/2012 |
| KR | 2012-0081460 A | 7/2012 |
| WO | 0198013 A1 | 12/2001 |
| WO | 2013157036 A1 | 10/2013 |

OTHER PUBLICATIONS

Australian Examination Report from AU 2014348493 dated Sep. 2, 2016.
Australian Examination Report from AU 2014348569 dated Aug. 19, 2016.
Australian Examination Report No. 1 from AU 2014348615 dated Aug. 19, 2016.
Australian Examination Report No. 1 from AU 2014348622 dated Oct. 26, 2016.
Australian Examination Report No. 1 from AU 2014348698 dated Sep. 2, 2016.
Australian Examination Report No. 1 from AU 2014348701 dated Aug. 17, 2016.
Australian Examination Report No. 2 from AU 2014348622 dated Sep. 29, 2017.
Australian Examination Report No. 2 from AU 2014348615 dated Jan. 3, 2017.
Australian Examination Report No. 2 from AU 2014348698 dated Jan. 4, 2017.
Australian Examination Report No. 2 from AU 2014348701 dated Jan. 13, 2017.
Communication pursuant to Article 94(3) EPC from EP 14 812 337.5 dated Jul. 27, 2017.
Communication pursuant to Article 94(3) EPC from EP 14 812 338.3 dated Jul. 27, 2017.
Canadian Office Action from corresponding Canadian Application No. 2,928,864 dated Mar. 27, 2017.
Canadian Office Action corresponding to Canadian Application No. 2,928,880 dated Mar. 28, 2017.
Canadian Office Action corresponding to Canadian Application No. 2,928,859 dated Dec. 19, 2017.
Canadian Office Action corresponding to Canadian Application No, 2,928,861 dated Apr. 4, 2017.
Canadian Office Action corresponding to Canadian Application No. 2,928,877 dated Mar. 28, 2017.
Canadian Office Action No. 2 corresponding to Canadian Application No. 2,928,856 dated Dec. 19. 2017.
Canadian Office Action from corresponding Canadian Application No. 2,928,856 dated Apr. 4, 2017.
International Search Report and Written Opinion dated Feb. 29, 2016 for PCT/US2015/060377 filed Nov. 12, 2015.
International Search Report and Written Opinion dated Apr. 14, 2015 for International Application No. PCT/US2014/065577 filed Nov. 13, 2014.
International Search Report and Written Opinion dated Apr. 1, 2015 for International Application No. PCT/US2014065353 filed Nov. 13, 2014.
International Search Report and Written Opinion dated Apr. 1, 2015 for International Application No. PCT/US2014/065566 filed Nov. 13, 2015.
International Search Report and Written Opinion dated Mar. 18, 2015 for International Application No. PCT/US2015/065340 filed Nov. 13, 2014.
International Search Report and Written Opinion dated Apr. 1, 2015 for International Application No. PCT/US2014/065351 filed Nov. 13, 2014.
International Search Report and Written Opinion dated Mar. 6, 2015 for International Application No. PCT/US2014/065504 filed Nov. 13, 2014.
International Search Report and Written Opinion dated Mar. 25, 2015 for International Application No. PCT/US2014/065346 filed Nov. 13, 2014.
International Search Report and Written Opinion dated Apr. 1, 2015 for International Application No. PCT/US2014/065487 filed Nov. 13, 2014.
Office Action from the Brazilian Industrial Property Journal No. 2536 for Brazilian Application No. BR112013010490-0, dated Aug. 13, 2019 with English translation, 6 pages.
Office Action from the Brazilian Industrial Property Journal No. 2536 for Brazilian Application No. BR112016010493-5, dated Aug. 13, 2019 with English translation, 6 pages.
Office Action from the Brazilian Industrial Property Journal No. 2536 for Brazilian Application No. BR112016010488-9, dated Aug. 13, 2019 with English translation, 6 pages.
Office Action from the Brazilian Industrial Property Journal No. 2536 for Brazilian Application No. BR112016010492-7, dated Aug. 13, 2019 with English translation, 6 pages.
Office Action from the Brazilian Industrial Property Journal No. 2536 for Brazilian Application No. BR112016010486-2, dated Aug. 13, 2019 with English translation, 6 pages.

* cited by examiner

COLLAR ASSEMBLY FOR SECURING CONSUMABLES OF AN ARC WELDING APPARATUS

CROSS-REFERENCE TO RELATED APPLICATIONS

This application is a divisional of U.S. non-provisional application Ser. No. 14/541,136 filed on Nov. 13, 2014, entitled "Collar Assembly For Securing Consumables Of An Arc Welding Apparatus," which claims the benefit of U.S. provisional application Ser. No. 61/903,950 filed on Nov. 13, 2013 and 62/053,784 filed on Sep. 22, 2014. The disclosures of the above applications are incorporated herein by reference in its entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal workpieces together. An inert gas is directed through the front (distal) end of the welding gun to provide a surrounding layer or blanket of shielding gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the workpieces. The contact tip transfers electrical current to the welding wire. The gas diffuser is typically threaded to the contact tip and defines gas passageways that direct the shielding gas into a blanket of shielding gas around the molten metal pool. The contact tip and gas diffuser are constantly subjected to high heat and are susceptible to wear due to high temperature operation.

SUMMARY

The present disclosure generally provides a contact tip/diffuser configuration for an arc welding apparatus, such as an MIG or GMAW welding gun with an increased consumable life. The various forms of the present disclosure provide a simplified structure, more uniform heat distribution and improved cooling to increase consumable life, among other benefits.

In one form, a collar assembly for use in securing a nozzle assembly to a welding torch is provided. The collar assembly comprises a collar body defining an exterior surface and an internal bore, and an internal flange extends radially and inwardly disposed at a distal end portion of the collar body. A wave spring is disposed against the internal flange and a locking ring is disposed against the wave spring.

In another form, a collar assembly for use in securing a nozzle assembly to a welding torch is provided. The collar assembly comprises a collar body defining an exterior surface and an internal bore, and an internal flange extends radially and inwardly disposed at a distal end portion of the collar body. A wave spring is disposed against the internal flange and a conductor tube defines an outward protrusion for engaging against the wave spring opposite the internal flange.

Further still, an arc welding apparatus comprises a conductor tube having a distal portion defining an external surface profile and an outward protrusion. A collar assembly comprises a collar body that defines an exterior surface and an internal bore. The internal bore further defines a distal portion having a distal diameter and a proximal portion having a proximal diameter. The distal diameter is smaller than the proximal diameter. A wave spring is disposed between the body and the exterior surface of the conductor tube and the wave spring biases the collar body between the outward protrusion and the distal portion. A sleeve comprises a body having a proximal end portion and a distal end portion. The body defines an inner and outer surface profiles. The inner surface profile is configured to slidably engage over the external surface profile of the conductor tube. The outer surface profile comprises a threaded portion. The sleeve engages against the collar body and secures the collar body on the conductor tube. A consumable assembly has an inner body. The inner profile is configured to mechanically attach to the threaded portion of the sleeve. The inner body has a distal end has an internal distal flange. A contact tip defines an external shoulder configured to abut the internal distal flange for securing the contact tip to the conductor tube. The inner body is threaded onto the thread portion of the sleeve and the inner body engages against the collar body displacing the collar body causing the wave spring to exert a biasing force through the collar body against the inner body pretensioning the consumable assembly on the threaded portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features. And although the term "MIG" or "GMAW" is used throughout the specification, it should be understood that the teachings of the present disclosure apply to any type of welding or cutting apparatus.

Figure 1:
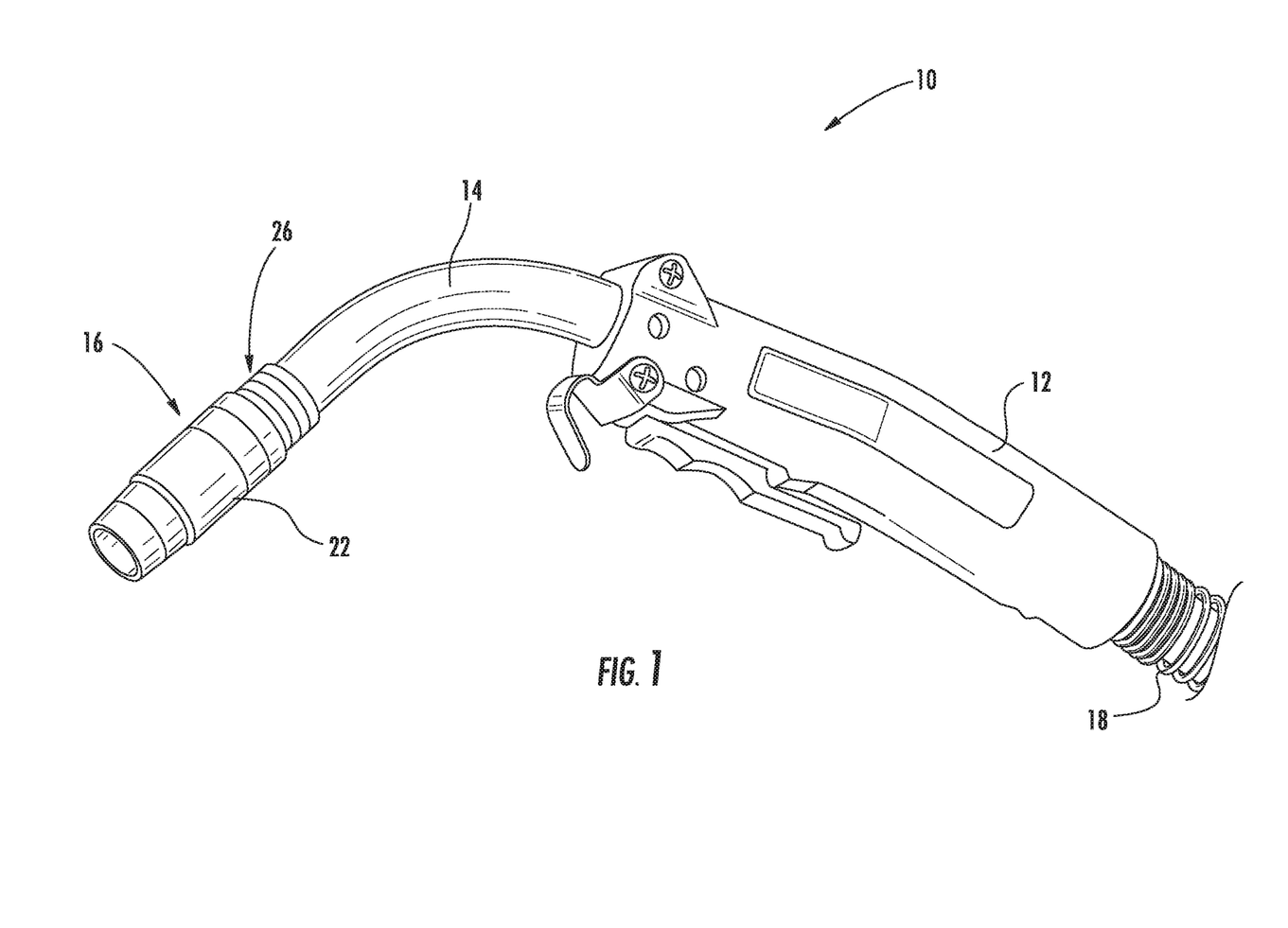
FIG. 1 is a perspective view of an arc welding apparatus constructed in accordance with the teachings of the present disclosure.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shield gas, and a welding wire (not shown) from a power source (not shown), a gas source (not shown), and a wire feeder (not shown) to the welding gun 10.

The consumable assembly 16 includes a plurality of consumable components including a nozzle assembly 22 and a contact tip 24 inside the nozzle assembly (contact tip 24 is shown in later FIGS. 2 and 3). The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety.

The consumable assembly 16 is connected to a distal end portion 26 of the conductor tube 14. The nozzle assembly 22 is substantially cylindrical in one form and receives the distal end portion 26 of the conductor tube 14 therein. The contact tip 24 is coaxially disposed inside the nozzle insert 22 and may be secured therein as illustrated and described in copending U.S. application Ser. No. 13/674,829 titled "Hollow Contact Tip-Diffuser for GMAW Manual/Robotic Arc Welding MIG Guns," which is commonly owned with the present application and hereby incorporated by reference in its entirety. Further construction and operation of an exemplary arc welding apparatus for which the teachings of present disclosure may be applied are also described in greater detail in the aforementioned copending application.

Figure 2:
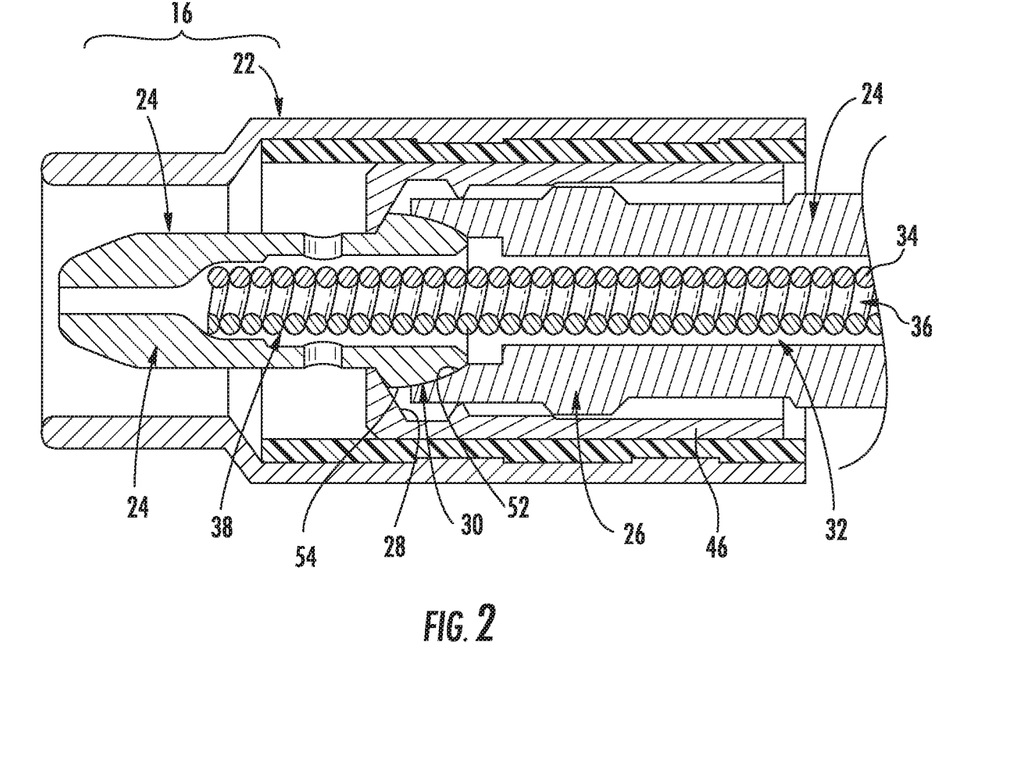
FIG. 2 is a cross-sectional view of a consumable assembly and a partial conductor tube and conduit liner constructed in accordance with the teachings of the present disclosure.
Figure 3:
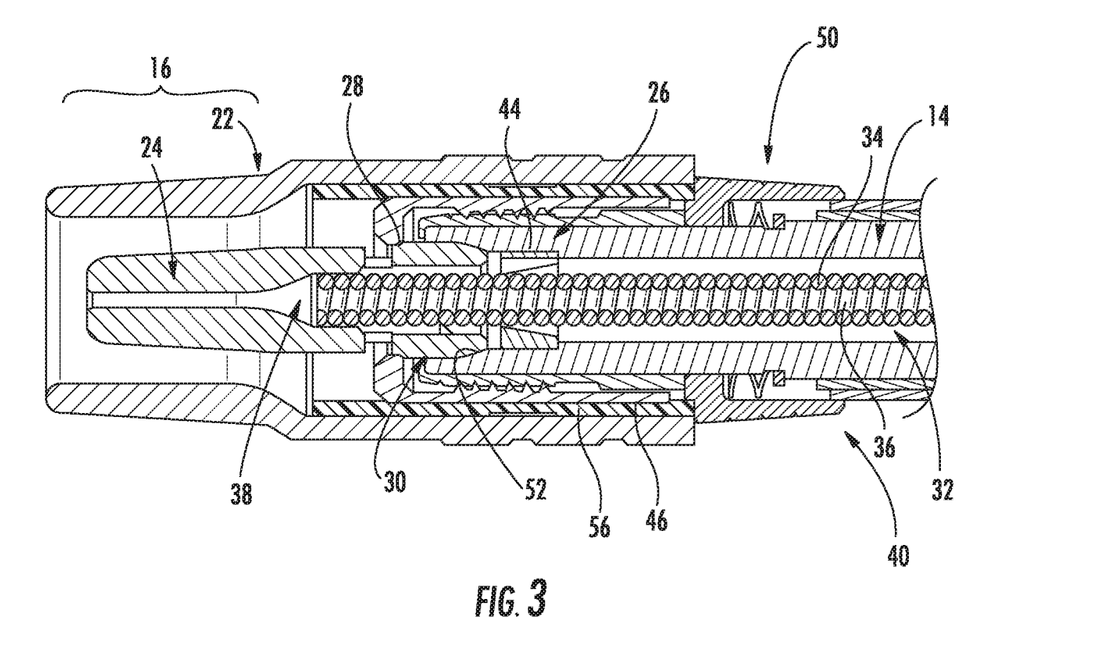
FIG. 3 is a cross-sectional view of a consumable assembly and a conductor tube assembly constructed in accordance with the teachings of the present disclosure.

Referring to FIG. 2, the consumable assembly 16 includes a contact tip 24 and the nozzle assembly 22. The nozzle assembly 22 is secured to the conductor tube assembly 40. As shown, the nozzle assembly 22 is secured to a distal end portion 26 of the conductor tube 14. The nozzle assembly 22 is substantially cylindrical in one form and receives the distal end portion 26 of the conductor tube 14 therein. In one form, a contact tip 24 is coaxially disposed inside the nozzle assembly 22. The nozzle assembly 22 further includes a seating surface 28 that is configured to mate with an end portion 30 of the contact tip 24 (which in one form is spherical as shown, but could be any shape including a linear or polynomial taper) into the distal end portion 26 of the conductor tube 14.

The conductor tube 14 defines an internal passageway 32, and a conduit liner 34 is disposed within the internal passageway 32 as shown. The conduit liner 34 has a guiding channel 36 for guiding the welding wire (not shown) to the contact tip 24. The conduit liner 34 extends into an internal cavity 38 of the contact tip 24. The positioning of the conduit liner 34 within the internal cavity 38 provides a continuous guiding channel 36 for directly feeding the welding wire into the contact tip 24. The location of the conduit liner 34 within the internal cavity 38 of the contact tip 24 may further reduce the possible jams of the welding wire by providing a continuous guiding channel 36 and removing any transitions between components that may hang-up of jam the feeding of the welding wire into the contact tip 24. Additional aspects of the location and features of the conduit liner 32 within the internal cavity 38 of the contact tip 24 has been disclosed in copending U.S. application Ser. No. 13/674,829 titled "Hollow Contact Tip-Diffuser for GMAW Manual/Robotic Arc Welding MIG Guns," which is commonly owned with the present application and hereby incorporated by reference in its entirety.

Figure 4A:
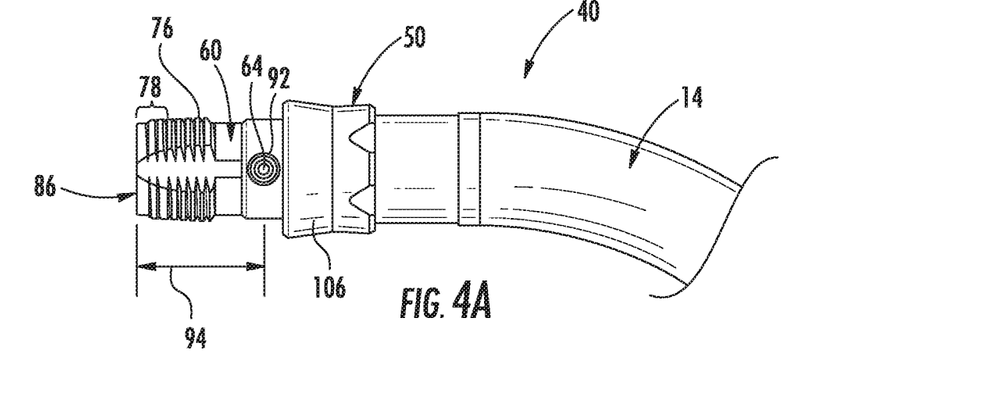
FIG. 4A is partial side view of a conductor tube assembly constructed in accordance with the teachings of the present disclosure.
Figure 4B:
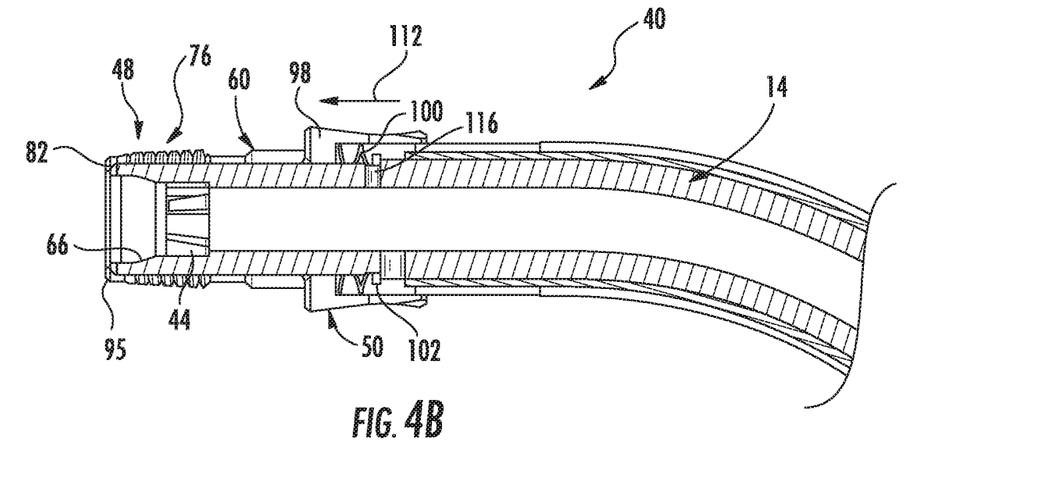
FIG. 4B is a partial side cross-sectional view of the conductor tube assembly of FIG. 7A.

As shown in FIGS. 4A and 4B, a conductor tube assembly 40 in one form of the present disclosure includes a conductor tube 14 having an alignment device 44 for guiding and centrally aligning a conduit liner 32 within the conductor tube 14, which will be described in greater detail below. The nozzle assembly 22 is secured to the distal end portion 26 of the conductor tube assembly 40 and pre-tensioned by a collar assembly 50, which will also be described in greater detail below.

Referring back to FIG. 2, the nozzle assembly 22 is secured onto the distal end 26 of the conductor tube assembly 40, and the contact tip 24 engages the seating surface 28 of the nozzle insert 46. As the nozzle assembly 22 is tightened onto a sleeve 60 of the conductor tube assembly 40, the seating surface 28 engages against a shoulder of the contact tip 24, thereby urging the spherical tapered end 30 of the contact tip 24 into a spherical tapered seat 52 of the conductor tube 14. As shown, the contact tip is wedged between the seating surface 28 and the spherical tapered seat 52. The wedging between the seating surface 28 and an angled shoulder 54 all function to align the contact tip 24 within the consumable assembly 16. In addition, as the nozzle assembly 22 is tightened onto the conductor tube assembly 40, the collar assembly 50 is biased against the nozzle body 56, thus providing a pre-tensioning load against the nozzle assembly 22, as discussed below in detail.

Figure 4C:
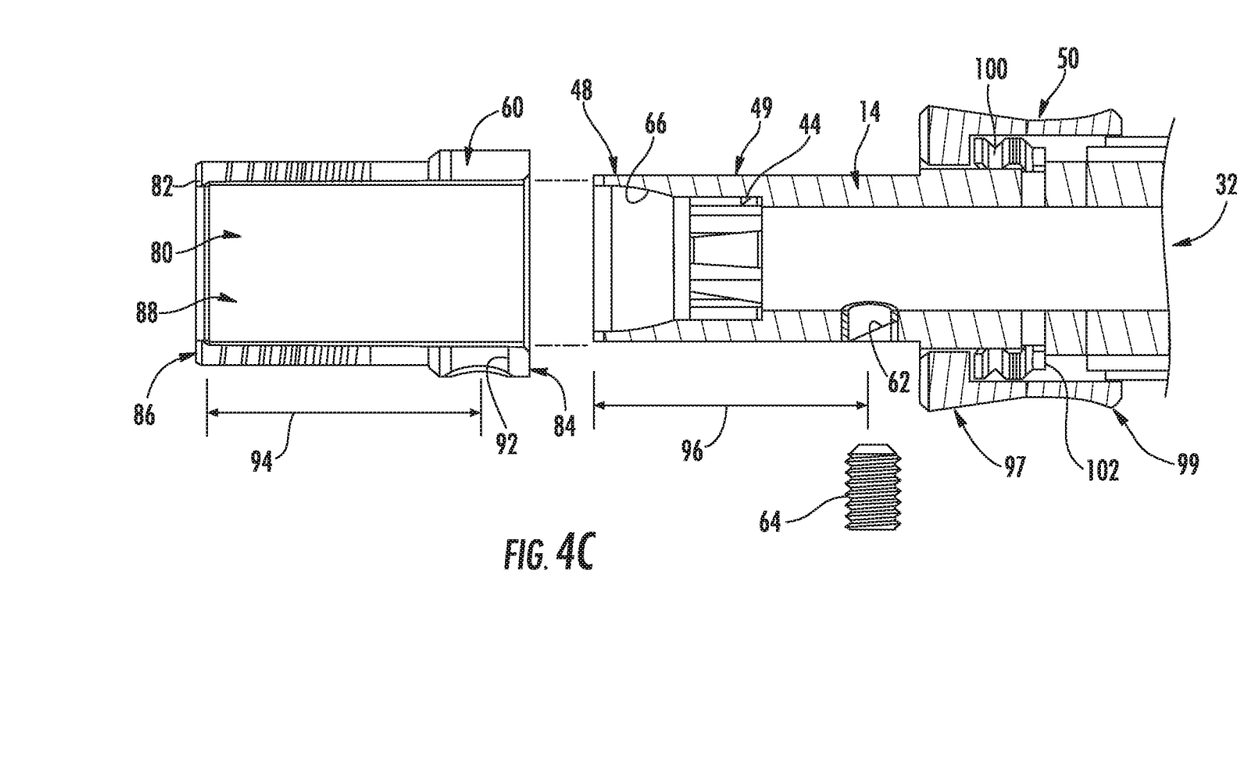
FIG. 4C is a partial exploded side cross-sectional view of the conductor tube assembly of FIG. 4A.

As shown in FIGS. 4A-4C, the conductor tube assembly 40 includes a sleeve 60 that slides over the profile of the outer surface 49 of the conductor tube 14. The interior profile 80 of the sleeve 60 matches the flat faces 58 of the conductor tube 14 to allow the sleeve 60 to slip fit over the distal end 48. The interior profile 80 and the flat faces 58 also provide an anti-rotational feature to prevent the sleeve 60 from rotating around the conductor tube 14. It should further be appreciated that the anti-rotation feature could include various cross-sectional shapes that offer flat, angled, or other non-matching profiles to inhibit the rotation of a mating component that slips over the distal end 48, and thus the forms illustrated and described herein should not be construed as limiting the scope of the present disclosure. Additionally, the sleeve 60 may include various geometries on an interior profile 80 for mating and sliding over the distal end 48 of the conductor tube 42. For example, the sleeve 60 may include configurations that allow for a greater contact area with the outer surface of the conductor tube 14 for improving the conduction heat transfer from the consumable assembly 16 to the conductor tube 14, such as, by way of example, a hexagonal configuration.

Referring to FIG. 4C, the sleeve 60 is secured to the conductor tube 14 in one form by the set screw 64 that is engaged through a threaded aperture 92 of the sleeve 60. The threaded aperture 92 is aligned with the threaded opening 62 of the conductor tube 14, and the set screw 64 removably secures the sleeve 60 in position over the distal end 48 of the conductor tube 14.

In one form, the sleeve 60 (FIG. 5) is threaded and includes threads 76 on its exterior surface as shown. The thread geometry and design can vary according to the desired torque and retention characteristics. In one form, the threads 76 may be of a standard pitch, and in another form, the thread pitch may be variable to improve retention of the consumable assembly 16. For example, the sleeve 60 in one form includes a leading taper of threads 78 that create a guide to initially align the consumable assembly 16. In one form, the leading taper 78 is created by varying a height of each thread 76 from the proximal end portion to the distal end portion of the sleeve. A maximum thread height is toward the proximal end portion 84 of the sleeve 60 and a minimum thread height is adjacent the distal end portion 86 of the sleeve 60. The leading taper 78 provides for easier alignment with the mating components, and this particular thread design also reduces the possibility of cross threading mating components. In another form, the sleeve 60 may optionally include a rounded front surface 95 for further assisting with the alignment of the mating components.

Figure 5:
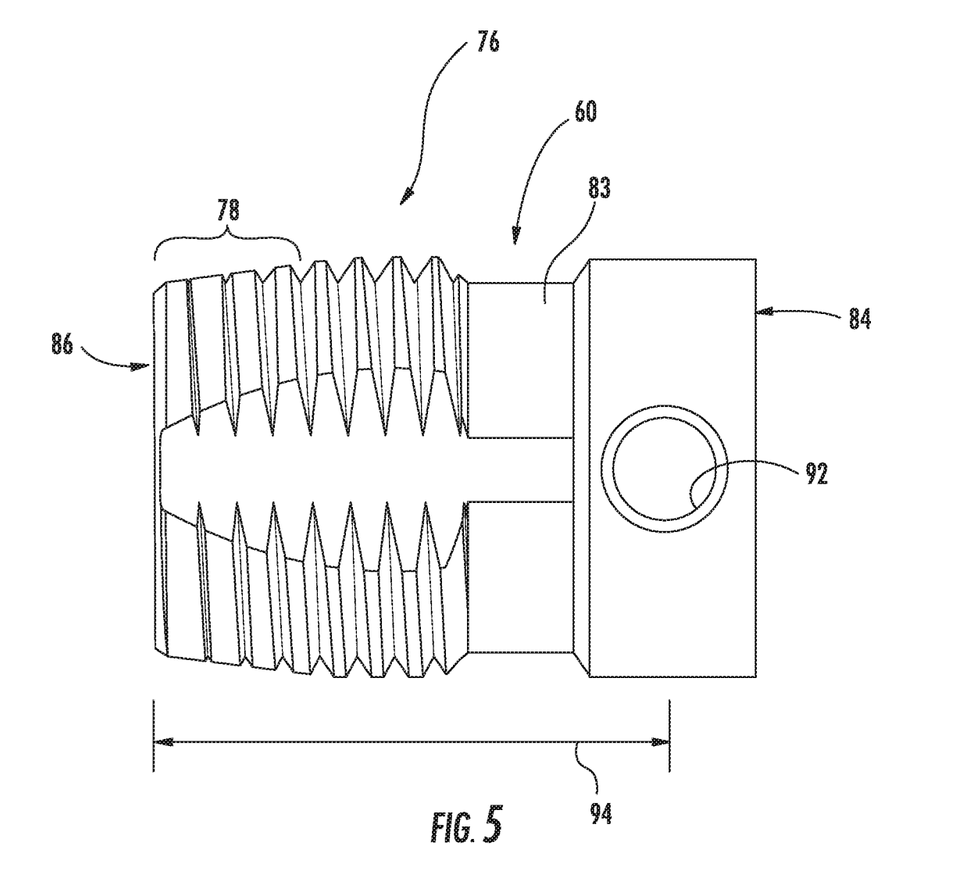
FIG. 5 is a side view of a sleeve for a conductor tube constructed in accordance with the teachings of the present disclosure.

The sleeve 60 may be manufactured by various methods including machining or a metal injection molding process, also known as MIM. The sleeve 60 manufactured by a MIM process allows for more complex geometries that are difficult to machine, by molding in more intricate shapes and features of the body 83 and the interior profile 80, for example, the tab 82 feature as previously set forth. These additional features may allow for additional protection of the conductor tube assembly 40 and/or may also include improvements to the heat transfer from the consumable assembly 16 by increasing the contact area between the sleeve 60 and the conductor tube 14, such as, by way of example, a hexagonal configuration, among others The sleeve 60 may be made of various hardened metals and alloys, such as a stainless steel alloy that resists deformation and impact damage. The sleeve 60 also provides additional strength to the distal end 48 of the conductor tube 14, since the copper material of the conductor tube 14 is relatively malleable. The conductor tube assembly 40 further addresses the issue of damaging threads on a conventional conductor tube assembly since the sleeve 60 is removable and replaceable.

Referring to FIGS. 6A-6D, in one form, the conductor tube assembly 40 includes a collar assembly 50. In one form, the collar assembly 50 comprises a collar body 98, a wave spring 100 and a locking ring 102. The collar body 98 defines an exterior surface 106 and an interior bore 108. The collar body 98 includes an internal flange 104 disposed at a distal end portion 110 of the collar body. The internal flange 104 projects radially and inwardly and defines an opening 114 have a distal diameter that is large enough to allow the collar assembly 50 to slide onto the distal end 26 of the conductor tube 14.

Figure 6A:
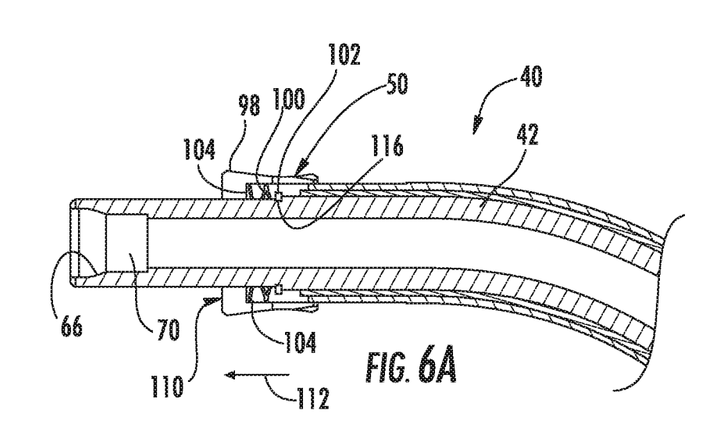
FIG. 6A is a partial side cross-sectional view of a conductor tube and a collar assembly constructed in accordance with the teachings of the present disclosure.
Figure 6B:
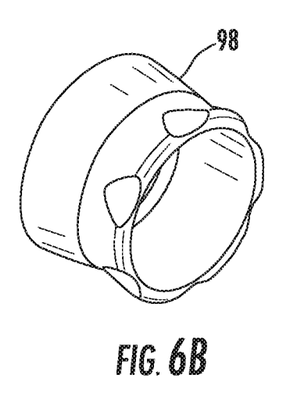
FIG. 6B is a perspective view of a collar body of the collar assembly of FIG. 6A.
Figure 6C:
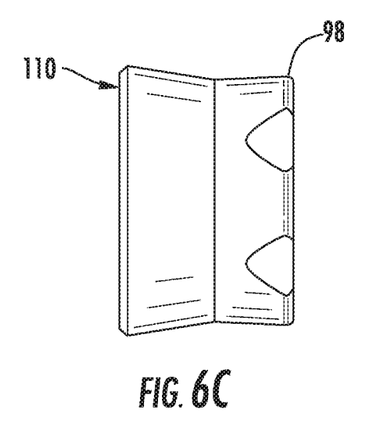
FIG. 6C is a side view of the collar body of FIG. 6B.
Figure 6D:
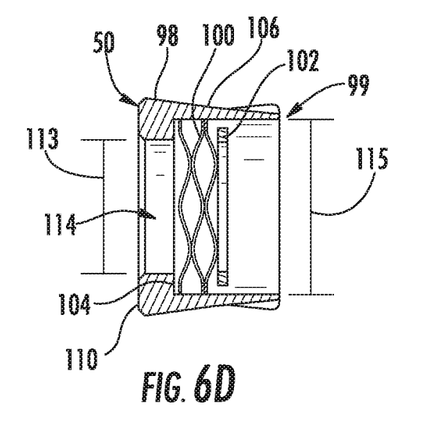
FIG. 6D is an cross-sectional view of the collar assembly of FIG. 6B.

As shown in FIG. 6D, the collar body 98 has a distal end portion 110 and a proximal end 99. The distal diameter 113 of the opening 114 in the distal end 97 is smaller than the proximal diameter 115 of the interior bore 108 at the proximal end 99. The wave spring 100 is positioned within the interior bore 108 of the collar body 98. When the collar assembly 40 is assembled onto the conductor tube 14, the wave spring 100 is disposed within an area or gap between the conductor tube 14 and the collar body 98 as shown. In another form, the collar body may define the exterior surface 106 and the interior bore 108 and the area for the wave spring is between formed by the changing diameters of the interior bore 108. In this form, the wave spring may bias the collar body against the distal end portion 110 having a distal diameter 113 smaller than the proximal diameter 115.

The conductor tube 14 in one form defines a circular groove 116, in which the locking ring 102 is disposed. The locking ring 102 engages within the circular groove 116 to hold the wave spring 100 in position and provides a surface for the wave spring 100 to create the biasing force against the internal flange 104. The wave spring is only one example of the various springs and the spring may provide a constant bias rate or be variable to provide the necessary force for the application.

In another form, the conductor tube may be integrally formed with an outward protrusion and eliminating the locking washer discussed above. The outward protrusion would engage the proximal side of the wave spring in the same manner at the locking washer, discussed above. The outward protrusion in still another form is a shoulder that may be machined into the distal end of the conductor tube.

Figure 7:
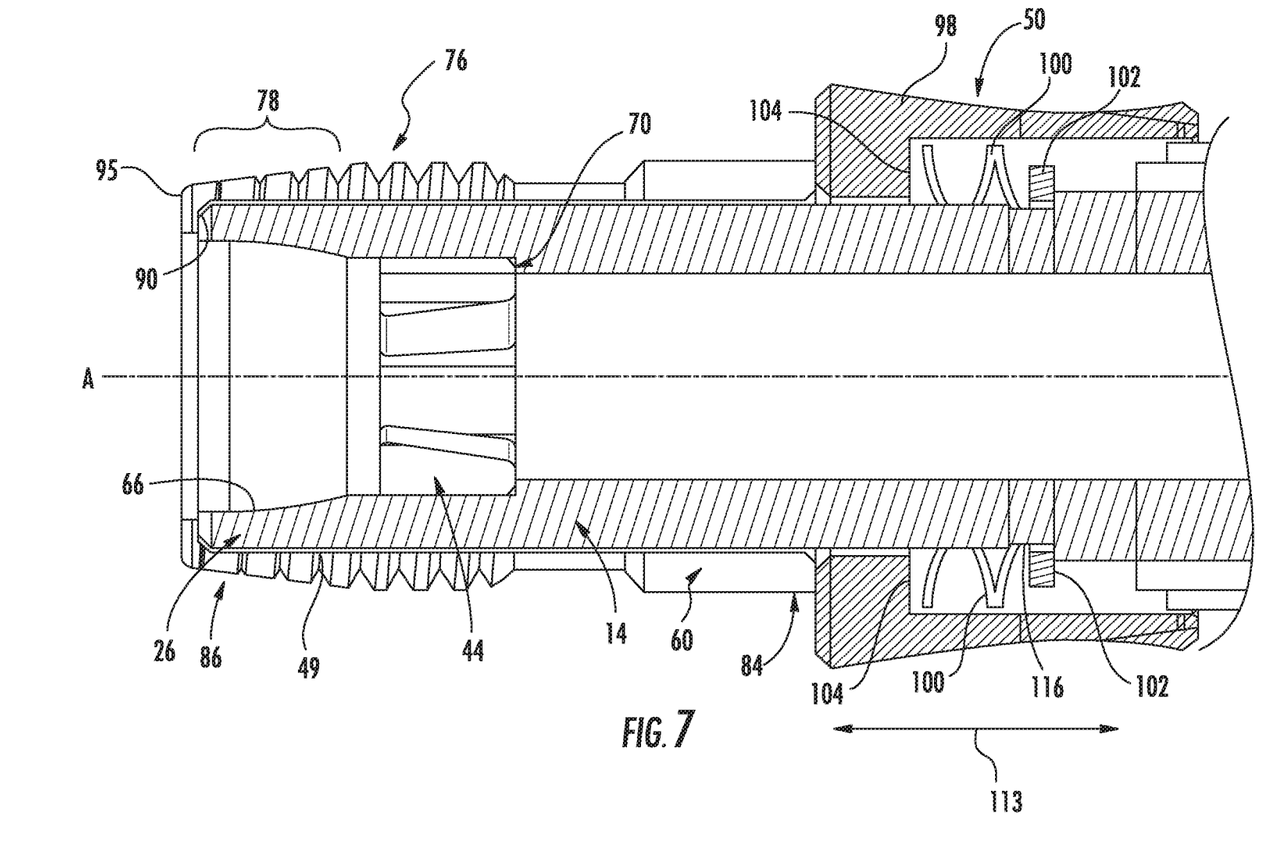
FIG. 7 an enlarged partial side cross-sectional view of the conductor tube assembly constructed in accordance with the teachings of the present disclosure

Referring to FIG. 7, the collar body 98 is secured in position on the conductor tube 14 by the sleeve 60. The collar body 98 is moveable, along a longitudinal axis A, between the proximal end portion 84 of the sleeve 60 and the locking ring 102, as indicated by directional arrow 113. The wave spring 100 creates a biasing force against the internal flange 104 and resists movement of the collar body 98 away from the distal end 48 of the conductor tube. The biasing force is used to provide pre-tensioning force against the consumable assembly 16 secured on the threads 76.

Figure 8:
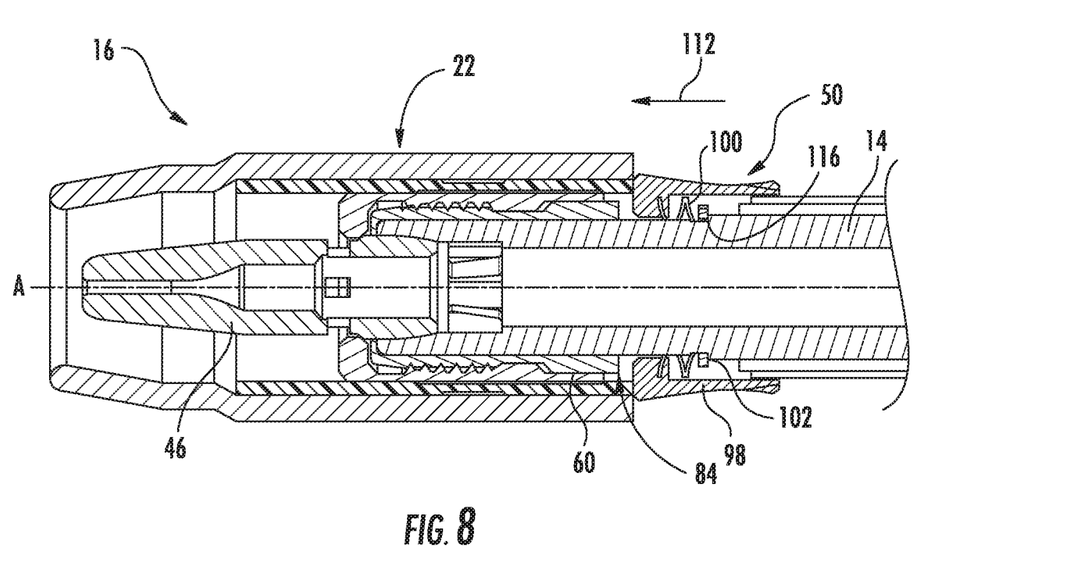
FIG. 8 is a cross-sectional view of a consumable assembly and a conductor tube assembly constructed in accordance with the teachings of the present disclosure.

As shown in FIG. 8, the consumable assembly 16 is secured against the collar body 98 causing the collar body 98 to move away from the distal end portion 84 of the sleeve 60. The wave spring 100 resists the movement of the collar body 98 with the biasing force, in the direction of arrow 112, which pre-tensions the engagement of the consumable assembly 16 on the threads 76 of the sleeve 60. The pre-tensioning engagement with the collar assembly 50 provides resistance against the consumable assembly 16 inadvertently loosening during operation of the welding gun. The exterior surface 106 of the collar body 98 may further include angled surfaces or other gripping features, such as knurls or scallops, to allow for ease of use when securing and removing the consumable assembly 16 from the conductor tube assembly 40.

Figure 9:
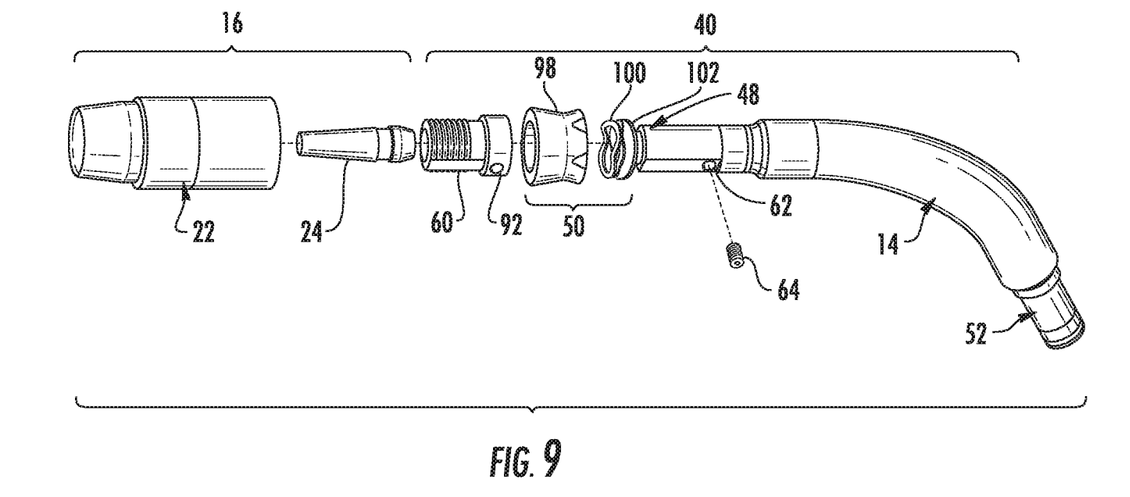
FIG. 9 is an exploded perspective view of a conductor tube assembly and a consumable assembly constructed in accordance with the teachings of the present disclosure.
Figure 10:
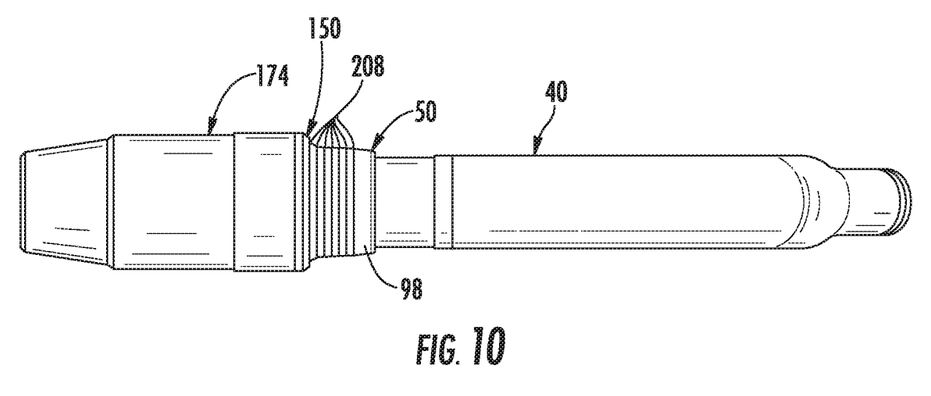
FIG. 10 is a top view of one form of a nozzle body, collar assembly and conductor tube assembly in accordance with the teachings of the present disclosure.

FIG. 9 summarizes and illustrates components of the conductor tube assembly 40 and the consumable assembly 16. The consumable assembly 16 includes the nozzle assembly 22 and the contact tip 24. The consumable assembly 16 is secured to the distal end 48 of the conductor tube 14 via the sleeve 60, and the collar assembly 50 pretensions the consumable assembly 16 to the conductor tube assembly 40, as previously set forth.

Figure 11A:
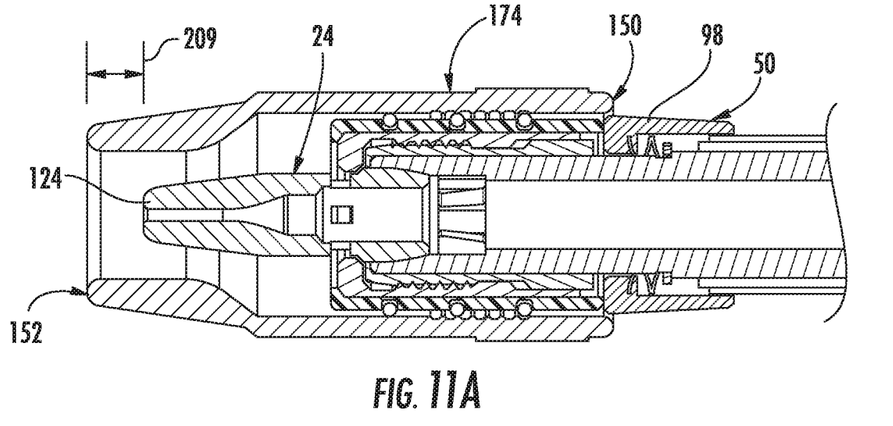
FIG. 11A is a partial cross-sectional view of the nozzle body of FIG. 18 10 in an initial position.
Figure 11B:
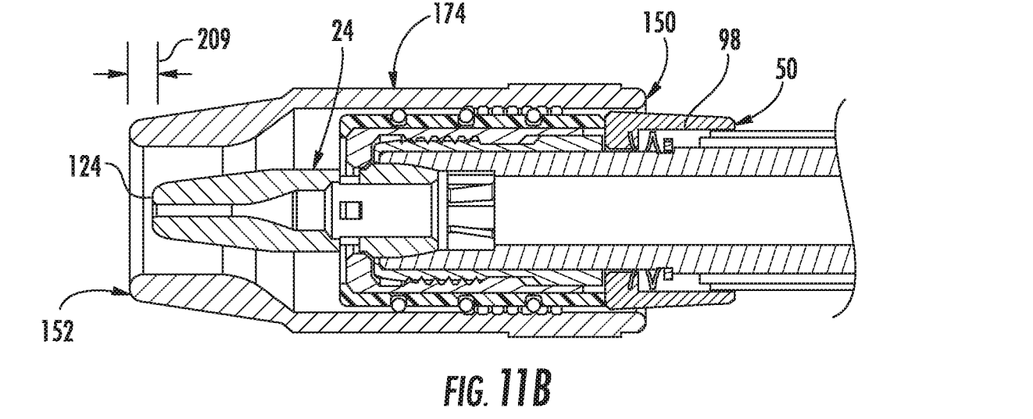
FIG. 11B is a partial cross-sectional view of the nozzle body of FIG. 10 in a first position.
Figure 11C:
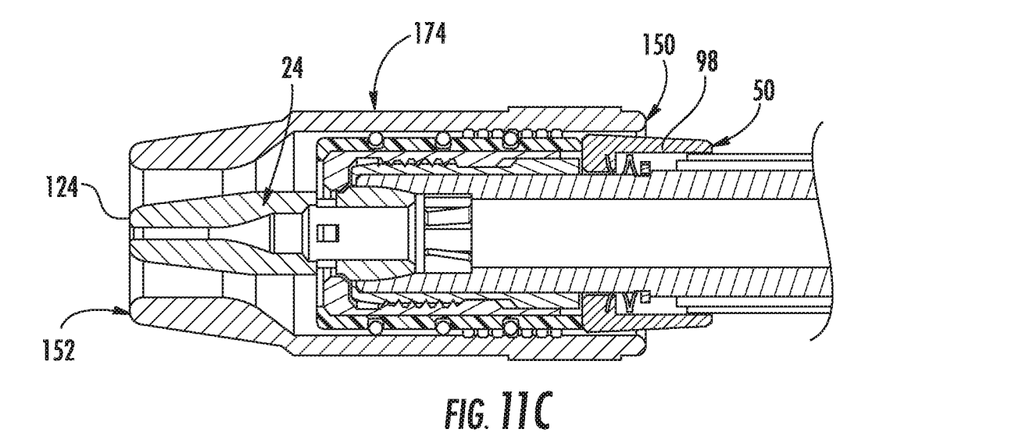
FIG. 11C is a partial cross-sectional view of the nozzle body of FIG. 10 in a second position.
Figure 11D:
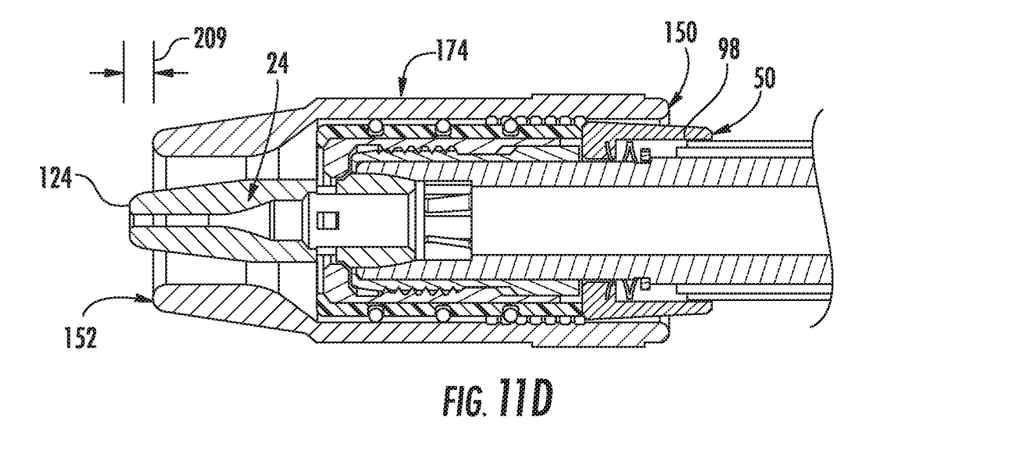
FIG. 11D is a partial cross-sectional view of the nozzle body of FIG. 10 in a third position.

Referring to FIGS. 10 and 11A to 11D, a collar assembly 50 includes a collar body 98. The collar body 98 includes indicia 208 for allowing a nozzle distance 209 to be set by aligning a proximal opening 150 of the nozzle body 174 with the desired nozzle distance 209. In one form there is an initial position and three additional positions for setting the nozzle distance 209. As shown in FIG. 11A, an initial exemplary position where a distal end face 124 of the contact tip 46 is recessed within the nozzle body 174 to the nozzle distance 209 of approximately ¼ inches. Referring to FIG. 11B, an example of a first position is shown with the distal end face 124 of the contact tip is recessed within the nozzle body 174 to the nozzle distance 209 of approximately ⅛ inches. As shown in FIG. 11C, an example of a second position is shown and in this form, the distal end face 124 of the contact tip 46 is flush with the distal opening 152 of the nozzle body 174. Referring to FIG. 11D, another example of a third position is shown with the distal end face 124 of the contact tip 46 protruding beyond the distal opening a nozzle distance of approximately ⅛ inches. Therefore, the indicia 208 on the collar body 98 is used to allow the user to quickly adjust the nozzle position without having to perform any manual measurements between the distal opening 152 of the nozzle body 174 and the distal end face 124 of the contact tip 46. It should be understood that the specific dimensions of ¼ and ⅛ inches are merely exemplary and should not be construed as limiting the scope of the present disclosure.

The previous examples are not suggested to limit other variations and are presented to teach possible embodiments of this disclosure.

The present disclosure is merely exemplary in nature and, thus, variations that do not depart from the spirit of the disclosure are intended to be within the scope of the present disclosure. Such variations are not to be regarded as a departure from the scope contemplated in the present disclosure.

What is claimed is:

1. An arc welding apparatus comprising:
a conductor tube having an end portion defining an external surface profile and an outward protrusion;
a collar assembly comprising:
a collar body defining an exterior surface and an internal bore, wherein the internal bore further defines a distal portion having a distal diameter and a proximal portion having a proximal diameter, wherein the distal diameter is smaller than the proximal diameter;
a wave spring disposed between the collar body and the external surface profile of the conductor tube and wherein the wave spring biases the collar body between the outward protrusion and an end of the conductor tube;
a sleeve comprising:
a body having a proximal end portion and a distal end portion, the body defining inner and outer surface profiles, the inner surface profile configured to slidably engage over the external surface profile of the conductor tube, and the outer surface profile comprising a threaded portion, and wherein the sleeve engages against the collar body to secure the collar body on the conductor tube;
a consumable assembly having an inner body, the inner body comprising:
an inner profile configured to mechanically attach to the threaded portion of the sleeve, and
a distal end having seating surface;
a contact tip defining an external shoulder configured to abut the seating surface for securing the contact tip to the conductor tube; and
wherein the inner body is threaded onto the threaded portion of the sleeve and the inner body engages against the collar body displacing the collar body causing the wave spring to exert a biasing force through the collar body against the inner body pretensioning the consumable assembly on the threaded portion.

2. The arc welding apparatus of claim 1, wherein the exterior surface of the collar body is profiled.

3. The arc welding apparatus of claim 2, wherein the profiled exterior surface is flared.

4. The arc welding apparatus of claim 2, wherein the profiled exterior surface defines a plurality of gripping ridges.

5. The arc welding apparatus of claim 1, wherein the exterior surface of the collar body includes indicia for allowing a nozzle distance to be set.

* * * * *